(12) United States Patent
Ushioda et al.

(10) Patent No.: US 6,303,698 B1
(45) Date of Patent: Oct. 16, 2001

(54) PROPYLENE COPOLYMER AND PROCESS FOR THE PRODUCTION THEREOF

(75) Inventors: Tsutomu Ushioda, Ichihara; Jun Saito, Kimitsu; Mototake Tsutsui, Ichihara; Yoshitoyo Yasuda, Ichihara; Hiroyuki Fujita, Ichihara; Yoshiyuki Ohgi, Yoshoshiba-machi, all of (JP)

(73) Assignee: Chisso Corporation, Osaka (JP)

( * ) Notice: Subject to any disclaimer, the term of this patent is extended or adjusted under 35 U.S.C. 154(b) by 0 days.

(21) Appl. No.: 09/486,921

(22) PCT Filed: Sep. 3, 1998

(86) PCT No.: PCT/JP98/03945

§ 371 Date: May 9, 2000

§ 102(e) Date: May 9, 2000

(87) PCT Pub. No.: WO99/11680

PCT Pub. Date: Mar. 11, 1999

(30) Foreign Application Priority Data

Sep. 4, 1997 (JP) .................................................. 9-239713

(51) Int. Cl.$^7$ ........................ C08F 210/06; C08F 255/02; C08F 4/642; C08F 297/08; B01J 31/00
(52) U.S. Cl. ........................ 525/322; 525/323; 526/125.1; 526/128; 526/351; 502/113
(58) Field of Search ..................................... 525/322, 323, 525/324; 526/125.1, 128, 351; 502/113

(56) References Cited

U.S. PATENT DOCUMENTS 5,504,171 * 4/1996 Etherton et al. ..................... 526/336
5,556,821 * 9/1996 Aida et al. ........................... 526/143

\* cited by examiner

Primary Examiner—James J. Seidleck
Assistant Examiner—Olga Asinovsky
(74) Attorney, Agent, or Firm—Leydig, Voit & Mayer, Ltd.

(57) ABSTRACT

Disclosed is propylene copolymers produced by the aid of a specific metallocene catalyst system, wherein a percentage of mis-insertion in the copolymer is highly controlled and the copolymers possess beat-resisting property and a high melt strength and a low MFR and are narrow in molecular weight distribution excellent in particulate properties as well as a process for producing the copolymers possessing high steroregularity at a practical polymerzation temperature. The gist of the present invention resides in production of propylene copolymers wherein copolymerization with α,ω-diene is carried out by the aid of a supported-type catalyst system comprised predominantly of the following compound (A), (B), (C) and (D) at a temperature above 45° C.:

the compound (A): a specific metallocene compound represented by $$Q(C_5H_{4-m}R^1{}_m)(C_5H_{4-n}R^2{}_n) \text{ MXY,}$$

the compound (B): an aluminoxane,
the compound (C): an organoaluminum compound, and
the compound (D): a particulate carrier.

An important feature of the propylene copolymers of the present invention resides in the fact that the copolymers are high stereoregular and have a ratio of a mis-inserted unit based on 2,1-insertion of propylene monomer in the total propylene insertion being defined within a specific range.

20 Claims, 1 Drawing Sheet

PROPYLENE COPOLYMER AND PROCESS FOR THE PRODUCTION THEREOF

TECHNICAL FIELD

The present invention relates to propylene copolymers and a process for producing same. More particularly, the present invention relates to propylene copolymers produced by the aid of a specific metallocene catalyst system, wherein the percentage of mis-insertion in the copolymers is highly controlled and the copolymers possess heat resisting property, a high melt strength, and a low MFR and are narrow in molecular weight distribution and excellent in particulate properties as well as a process for producing the copolymers possessing high stereoregularity at a practical polymerization temperature.

BACKGROUND ART

Olefin polymers or copolyners such as polypropylene or polyethylene are excellent in mechanical properties and chemicals-resistance and are very useful in balance to an economic aspect so that they are employed in the field of various moldings. In the past, these olefin polymers or copolymers were produced by polymerizing or copolymerizing olefins by the aid of a so-called Ziegler-Natta catalyst which is a combination of a transition metal catalytic component comprising titanium trichloride and/or tetrachloride carried on a support such as magnesium chloride with an organoaluminum compound.

In recent years, on the other hand, a process for producing olefin polymers or copolymers by polymerizing or copolymerizing olefins by the aid of a new catalyst different from the conventional catalyst system has been carried out, the new catalyst being comprised of a metallocene and an aluminoxane. Olefin polymers or copolymers produced by way of this metallocene catalyst system are distinguished by their narrow molecular weight distribution and by the fact that in case of copolymers, the comonomer has homogeneously been copolymerized therein so that olefin polymers or copolymers which are more homogeneous than the conventional olefin copolymers or copolymers can be obtained. However, olefin polymers or copolymers obtained by way of these metallocene catalysts are lower in melt strength and may be limited in use according to the fields of application, as compared with olefin polymers or copolymers obtained by way of a conventional catalyst system.

As means for enhancing melt strength and elevating crystallizing temperature of polypropylene, there are disclosed a process wherein polypropylene is reacted with an organic peroxide and a crosslinking assistant in molten state (Japanese Laid-open Patent Appln. No. Sho. 59-93711 and Japanese Laid-open Patent Appln. No. Sho. 61-152754), and a process wherein a semi-crystalline polypropylene is reacted with a low decomposition temperature peroxide in the presence of oxygen to produce polypropylene having long chain branches and containing no gel (Japanese Laid-open Patent Appln. No. Hei. 2-298536).

As another means for enhancing melt strength and melt viscoelasticity, there are proposed a composition incorporated with polyethylene or polypropylene different in intrinsic viscosity or molecular weight or a process for producing such composition according to a multi-stage polymerization.

Such examples include, for example, a process wherein 100 parts by weight of ordinary polypropylene is incorporated with 2–30 parts by weight of ultra-high molecular weight polypropylene and a mixture is extruded at a temperature above the melting point but lower than 210° C. (Japanese Patent Publn. No. Sho. 61-28694), an extruded sheet comprising two different polypropylene components of a limiting viscosity ratio of at least 2 obtained according to the multi-stage polymerization method (Japanese Patent Publn. No. Hei. 1-12770), a process for producing a polyethylene composition comprising 3 kinds of polyethylene different in viscosity average molecular weight containing 1–10% by eight of polyethylene of a high viscosity average molecular weight according to melt-kneading method or a multi-stage polymerization method (Japanese Patent Publn. No. Sho. 62-61057), a process for producing polyethylene wherein ultra-high molecular weight polyethylene having at least a limiting viscosity of 20 dl/g is polymerized by 0.05–1% by weight according to the multi-stage polymeion method by the aid of a highly active titanium-vanadium solid catalyst component (Japanese Patent Publn. No. 5-79683), and a process for producing polyethylene wherein ultra-high molecular weight polyethylene having a limiting viscosity of at least 15 dl/g is polymerized by 0.1–5% by weight according to the multi-stage polymerization method using a polymerization vessels of a specific configuration by the aid of a highly active tinum catalyst component subjected to a preliminary polymerization treatment with 1-butene or 4-methyl-1-pentene (Japanese Patent Publn. No. Hei. 7-8890).

Further known are a process for producing polypropylene of high melt strength by polymerization of propylene by the aid of a preliminary polymerization catalyst derived from a supported-type titaiium-containing solid catalyst component and an organoaluminum compound catalyst component subjected to a preliminary polymerization treatment with ethylene and a polyene (Japanese Laid-open Patent Appln. No. Hei. 5-222122) and a process for producing a linear low density polyethylene (LLDPE) of high melt strength by the aid of a preliminary polymerization catalyst containing polyethylene of a limiting viscosity of at least 20 dl/g obtained by a similar catalyst component subjected to preliminary polymerization with ethylene alone (Japanese Laid-open Patent Appln. No. Hei. 4-55410).

As an attempt to enhance melt tension in case of using the metallocene catalyst system, there are proposed a process wherein a catalyst comprising a silica support containing 1.0% by weight of water, a metallocene, a methylalumiinoxane and triisobutylalunanum is used (Japanese Laid-open Patent Appln. No. Hei. 5-140224), a process wherein two kinds of metallocene compounds are used as catalyst component (Japanese Laid-open Patent Appln. Nos. Hei. 5-255436, 5-255437, and 6-206939) and a process wherein montrnorillonite is used in the metallocene catalyst system (Japanese Laid-open Patent Appln. No. Hei. 7-188336).

In these various compositions or a process for producing thereof, however, enhancement of melt strength to a certain degree may be recognized under the measurement condition of polyolefins at 190° C., nevertheless problems still remain in obtaining enhancement of melt strength under the use condition above 200° C., the presence of odor due to the crosslinking assistant, and in obtaining enhancement of physical properties other than melt strength such as heat-resisting property and crystallizing temperature.

In the case where a metallocene catalyst system is used, the processes proposed above may be effective to enhance melt tension to a certain degree under the measurement condition of polyolefin at 190° C., but are not sufficient to ethance melt tension at higher temperature, for example, under use condition above 200° C. so that enhancement of melt strength is continuously desired.

In recent years, examples of copolymers of a non-conjugated diene and propylene or the like is reported which is polymerized by, the aid of a metallocene catalyst, for example, in Japanese Laid-open Patent Appln. Nos. Hei. 5-222251 and Hei. 5-222121. In Examples of these publications, however, there is nowhere given the case of using metallocene catalysts. It cannot but be anticipated therefore that propylene copolymers obtained by copolymerizing propylene at a practical polymerization temperature above 45° C. by the aid of a metallocene catalyst are low in stereoregularity and not satisfactory in molecular weight in addition to insufficient melt strength so that the copolymers are unable to use practically.

In Japanese Laid-open Patent Appln. No. Hei. 7-138327, there is reported an example for copolymerization of propylene and an α,ω-diene. In this case, however, the polymerization temperature is lower than 45° C. at which a practical polymerizatkin is carried out and the molecular weight of the resultant copolymer is extremely low. What is more, since the catalyst is not carried on a support, mass production of copolymers in a practical process may be difficult.

In Japanese Laid-open Patent Appln. No. Hei. 8-92317, too, there is reported an example of copolymerization for propylene and a polyene. However, the polymerization temperature is lower than 45° C. which is a practical polymerization temperature. Further, stereoregularity of the resultant copolymer is at any rate high at a polymerization of 25° C. shown in Examples but lower at a polymerization temperature above 45° C. During insertion of the total propylene, a ratio of a mis-inserted unit based on 2,1-insertion of propylene monomer is greater than 1.0% so that it cannot be said that control of high stereoregularity is made. Moreover, the catalyst system is not carried on a support so that mass production of the copolymer is impossible in a practical process.

This publication nowhere gives any description or suggestion on heat-resisting property of a copolymer of propylene or the like olefin with an α,ω-diene copolymerized by the aid of a metllocene catalyst system.

Accordingly, it is an object of the present invention to provide propylene copolymers possessing a narrow molecular weight distribution, high melt strength, heat-resisting property, a low MFR and excellent in particulate properties wherein the percentage of mis-insertion in the copolymer is highly controlled as well as a process for producing the copolymers wherein high stereoregularity is maintained even at a practical polymerization temperature.

DISCLOSURE OF THE INVENTION

The present invention has been proposed to achieve the aforesaid object and has an important feature in copolymerization of propylene with a small amount of an α,ω-diene by the aid of a specific catalyst system.

According to the present invention, there is provided propylene copolymers comprised predominantly of a copolymer of propylene and an α,ω-diene and having a melting point of 147–160° C., a ratio of a mis-inserted unit based on 2,1-insertion of propylene monomer in the total propylene insertion being 0.05–1.0%, a content of the α,ω-diene being 0.01–2% by weight, and a Mw/Mn of 1.5–3.8.

According to the present invention, there is also provided the aforesaid propylene copolymers wherein a melting point is 152–160° C.

According to the present invention, there is further provided propylene copolymers comprised predominantly of a random copolymer of propylene and 0.1–15% by weight of ethylene and/or an α-olefin having at least 4 carbon atoms and having melting point of 100–160° C., a ratio of a mis-inserted unit based on 2,1-insertion of propylene monomer in the total propylene insertion being 0.05–1.0%, a content of an α,ω-diene being 0.01–2% by weight, and a Mw/Mn of 1.5–3.8, which has been obtained by conducting copolymerization of propylene and ethylene and/or an α-olefin having at least 4 carbon atoms.

According to the present invention, there is further provided propylene copolymers comprised predominantly of a random copolymer of propylene and 0.1–15% by weight of ethylene and/or an α-olefin having at least 4 carbon atoms and having melting point of 100–160° C., a ratio of a mis-inserted unit based on 2,1-insertion of propylene monomer in the total propylene insertion being 0.05–1.0%, a content of an α,ω-diene being 0.01–2% by weight, and an Mw/Mn being 1.5–3.8, which has been obtained by conducting copolymerization of propylene and ethylene and/or an α-olefin having at least 4 carbon atoms.

According to the present invention, there is still further provided propylene-based block copolymers having a ratio of mis-inserted unit based on 2,1-insertion of propylene monomer in the total propylene insertion being 0.05–1.0%, and a content of an α,ω-diene being 0.01–2% by weight, which are comprised of a propylene homopolymer or a propylene random copolymer containing 0.1–15% by weight of ethylene and/or an α-olefin with at least 4 carbon atoms as a first stage polymerization product, and a propylene random copolymer as a rubbery component containing 30–80% by weight of ethylene and/or an α-olefin with at least 4 carbon atoms as a successive second stage polymerization product, a proportion of the second stage polymerization product being 5–70% by weight, and an α,ω-diene having been random copolymerized at the first stage and/or the second stage polymerization.

According to the present invention, there is still further provided the aforesaid propylene copolymers wherein an α-olefin is at least one selected from the group consisting of 1-butene, 1-hexene and 1-octene.

According to the present invention, there is still further provided the aforesaid propylene copolymers wherein an α,ω-diene is at least one selected from the group consisting of 1,5-hexadiene, 1,7-octadiene and 1,9-decadiene.

According to the present invention, there is still further provided the aforesaid propylene copolymers wherein the α,ω-diene is 1,9-decadiene.

According to the present invention, there is still further provided the aforesaid propylene copolymers wherein the content of the α,ω-diene is from 0.01% by weight to 0.05% by weight.

According to the present invention, there is provided a process for producing the propylene copolymers at a temperature above 45° C. by the aid of a catalyst system comprised predominantly of the following compounds (A), (B), (C) and (D):

the compound (A) being a transition metal compound of the general formula:

wherein $(C_5H_{4-m}R^1_m)$ and $(C_5H_{4-n}R^2_n)$ each stand for a substituted cyclopentadienyl group, m and n each stands for an integer of 1–3, $R^1$ and $R^2$ may be the same or different and each stands for a hydrocarbon group with 1–20 carbon atoms, a silicon-containing hydrocarbon group, with the proviso that the site and kind of $R^1$ and $R^2$ on the cyclopentadienyl rings should take a configuration where any symmetrical plane containing M is absent and that $R^1$ or $R^2$ is existent in at least one carbon atom adjacent to the carbon atom connected to Q in at least one cyclopentadienyl ring, Q stands for a bivalent hydrocarbon radical, unsubstituted silylene radical or a hydrocarbon-substituted silylene radical bridging the groups $(C_5H_{4-m}R^1{}_m)$ and $(C_5H_{4-n}R^2{}_n)$, M stands for a transition metal Ti, ZT or Hf, and X and Y may be the same or different and each stands for a hydrogen atom a halogen atom or a hydrocarbon group, the compound (B) being an aluminoxane, the compound (C) being an organoaluminum compound, and the compound (D) being a finely particulate carrier.

According to the present invention, there is still further provided a process for producing the aforesaid propylene copolymers wherein the compound (A) is dimethylsilylene (2,3,5-trimethylcyclopentadienyl)(2',4', 5'-trimethylcyclopentadienyl)-zirconium dichloride or dimethylsilylene(2,3,5-trimethylcyclopentadienyl) (2',4',5'-trimethylcyclopentadienyl)hafnium dichloride.

According to the present invention, there is still further provided a process for producing the aforesaid propylene copolymers wherein the copolymers are produced by a vapor phase polymerization process.

BRIEF DESCRIPTION OF THE DRAWING

This FIGURE is a flow sheet showing a process for producing propylene copolymers of the present invention.

A BEST EMBODIMENT FOR CARRYING OUT THE INVENTION

Figure 1:
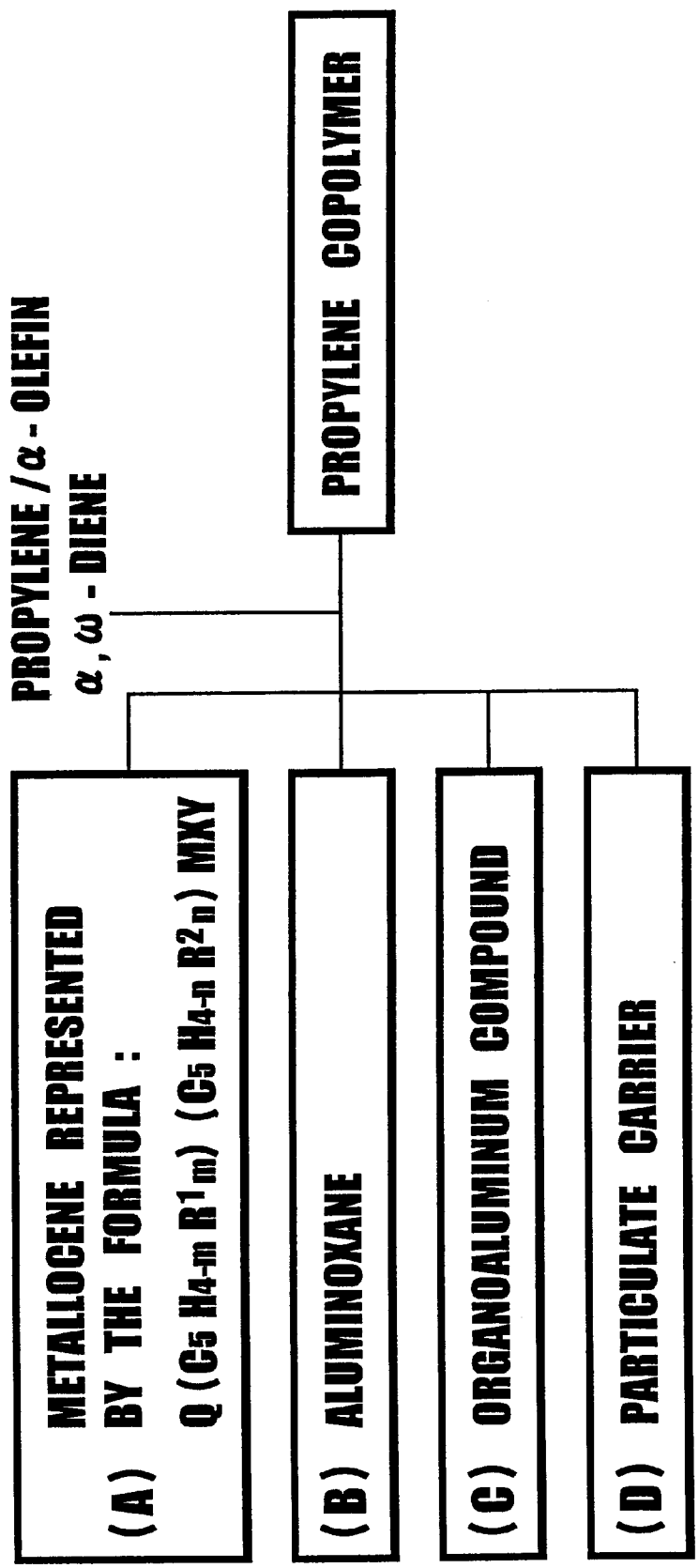

An important feature of the present invention resides in propylene copolymers polymerized at a temperature above 45° C. by the aid of a supported-type catalyst system using a specific metallocene compound.

Propylene copolymers obtained according to this process are the copolymers of high stereoregularity having a melting point of 147–160° C., preferably 152–160° C. which have not been obtained by using conventional catalyst systems.

The supported-type catalyst system used in the present invention is comprised predominantly of the following compounds (A), (B), (C) and (D):

the compound (A) being a transition metal compound of the general formula:

$Q(C_5H_{4-m}R^1{}_m)(C_5H_{4-n}R^2{}_n)$ MXY   [I]

wherein $(C_5H_{4-m}R^1{}_m)$ and $(C_5H_{4-n}R^2{}_n)$ each stand for a substituted cyclopentadienyl group, m and n each stands for an integer of 1–3, $R^1$ and $R^2$ may be the same or different and each stands for a hydrocarbon group with 1–20 carbon atoms, a silicon-containing hydrocarbon group, with the proviso that the site and kind of $R^1$ and $R^2$ on the cyclopentadienyl rings should take a configuration where any symmetrical plane containing M is absent and that $R^1$ or $R^2$ is existent in at least one carbon atom adjacent to the carbon atom connected to Q in at least one cyclopentadienyl ring, Q stands for a bivalent hydrocarbon radical, unsubstituted silylene radical or a hydrocarbon-substituted silylene radical bridging the groups $(C_5H_{4-m}R^1{}_m)$ and $(C_5H^{4-n}R^2{}_n)$, M stands for a transition metal Ti, Zr or Hf, and X and Y may be the same or different and each stands for a hydrogen atom, a halogen atom or a hydrocarbon group, the compound (B) being an aluminoxane, the compound (C) being an organoaluminum compound, and the compound (D) being a finely particulate carrier.

The propylene polymers or copolymers of the present invention obtained by the aid of the carrier type catalyst system at a temperature above 45° C. are deformed as given in the following factors (1)–(3):

(1) Propylene copolymers comprised predominantly of propylene and an α,ω-diene having a melting point of 147–160° C., preferably 152–160° C., a ratio of a mis-inserted unit based on 2,1-insertion of propylene monomer in the total propylene insertion being 0.05–1.0%, a content of the α,ω-diene being 0.01–2% by weight and an Mw/Mn being 1.5–3.8.

(2) Propylene copolymers comprised predominantly of a random copolymer of propylene and 0.1–15% by weight of ethylene and/or an α-olefin having at least 4 carbon atoms and having melting point of 100–160° C., a ratio of a mis-inserted unit based on 2,1-insertion of propylene monomer in the total propylene insertion being 0.05–1.0%, a content of an α,ω-diene being 0.01–2% by weight, and an Mw/Mn being 1.5–3.8, which has been obtained by conducting copolymerization of propylene and ethylene and/or an α-olefin having at least 4 carbon atoms.

(3) Propylene-based block copolymers having a ratio of a mis-inserted unit based on 2,1-insertion of propylene monomer in the total propylene insertion being 0.05–1.0%, and a content of an α,ω-diene being 0.01–2% by weight, which are comprised of a propylene homopolymer or a propylene random copolymer containing 0.1–15% by weight of ethylene and/or an α-olefin with at least 4 carbon atoms as a first stage polymerization product, and a propylene random copolymer as a rubbery component containing 30–80% by eight of ethylene and/or an α-olefin with at least 4 carbon atoms as a successive second stage polymerization product, a proportion of the second stage polymerization product being 5–70% by weight, and an α,ω-diene having been random copolymerized at the first stage and/or the second stage polymerization.

Any of the diene compounds having a vinyl bond at least α-position and ω-position can be used as the α,ω-diene compound used in the present invention, which may have a linear chain structure or a branched chain structure and may contain a hetero atom such as an oxygen atom, a sulfur atom or a boron atom, or a hetero atomic group. Illustrative of the α,ω-diene compound are, for example, 1,3-butadiene, 1,4-pentadiene, 1,5-hexadiene, 1,6-heptadiene, 1,7-octadiene, 1,8-nonadiene, 1,9-decadiene, 1,10-undecadiene, 1,11-dodecadiene, 1,13 tetradecadiene, and divinylbenzene. Preferable are 1,5-hexadiene, 1,7-octadiene, and 1,9-decadiene, and more preferable is 1,9-decadiene. A content of the α,ω-diene is preferably 0.01–0.1% by weight. If the content is excessive, a gel portion will be formed thus resulting in inconvenience such as recycling by re-melting being difficult.

Examples of the α-olefin utilizable for the present invention include, for example, 1-butene, 1-hexene, 2-octene, 1-decene, 4-methyl-1-pentene and styrene. Among them, 1-butene is especially preferable No limitation exists in the process for producing the propylene copolymers (1)–(3) of the present invention so far as the process satisfies the aforesaid factors. The propylene copolymers can, however, be produced preferably by carrying out the polymerization at a temperature above 45° C. by the aid of the supported-type catalyst system.

Examples of the compound (A) in the supported-type catalyst system include any of the compounds involved in the above definition. Illustrative of the compound (A) are, for example, dimethylsilylene(2,3,5-trimethylcyclopentadienyl)(2',4',5'-trimethylcyclopentadienyl)titanium dichloride, dimethylsilylene(2,3,5-trimethylcyclo-pentadienyl) (2',4',5'-trimethylcyclopentadienyl)zirconium dichloride, dimethylsilylene-(2,3,5-trimethylcyclopentadienyl)(2',4',5'-trimethylcyclopentadienyl)zirconium dimethyl, dimethylsilylene(2,3,5-trimethylcyclopentadienyl) (2',4',5'-trimethylcyclo-pentadienyl)hafnium dichloride, dimethylsilylene(2,3,5-trimethylcyclopenta-dienyl) (2',4',5'-trimethylcyclopentadienyl)hafnium dimethyl, dimethylsilylene-bis(2-methyl-4-phenylindenyl)zirconium dichloride, dimethylsilylene-bis(2-ethyl-4-phenyl-indenyl) zirconium dichloride, etc. Especially preferable is dimethylsilylene(2,3,5-trimethylcyclopentadienyl)(2',4',5'-trimethylcyclopentadienyl)zirconium dichloride.

The aluminoxane of the compound (B) means an organoaluminum compound of the following general formula (1) or (2):

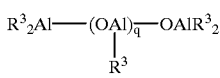
[1]

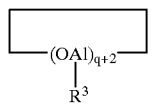
[2]

In these formulas, $R^3$ stands for a hydrocarbon group with 1–6, preferably 1–4 carbon atoms, more particularly, an alkyl group such as methyl, ethyl, propyl, butyl, isobutyl, pentyl or hexyl group; an alkenyl group such as allyl, 2-methylallyl, propenyl, isopropenyl, 2-methyl-1-propenyl or butenyl group; a cycloalkyl group such as cyclopropyl, cyclobutyl, cyclopentyl or cyclohexyl group; and an aryl group. Among these groups, an alkyl group is especially preferable. Each of $R^3$ groups may be the same or different. The notation q stands for an integer of 4–30, preferably 6–30, more preferably 8–30.

The aforesaid aluminoxane can be prepared in any of the known methods under various conditions. More particularly, the following methods can be illustrated:

(1) A method wherein a trialkylaluminum is reacted directly with water, using an organic solvent such as toluene or ether, (2) A method wherein a trialkylaluminum is reacted with a salt containing water of crystallization, for example, cupric sulate hydrate, aluminum sulfate hydrate, etc., (3) A method wherein a trialkylauminum is reacted with silica gel impregnated with water, (4) A method wherein trimethylaluminum is mixed with triisobutylauminum and the mixture is reacted directly with water, using an organic solvent such as toluene or ether, (5) A method wherein trimethyaluminmm is mixed with triisobutylaluminum and the mixture is reacted with a salt containing water of crystallization, for example, cupric sulfate hydrate or aluminum sulfate hydrate, and (6) A method wherein silica gel or the like is impregnated with water, then reacted with triisobutylaluminum, and thereafter with trimethylaluminum.

Illustrative of the organoaluminum compound of the compound (C) are, for example, trialkylaluminums such as trimethylaluminum, triethylaluminum, triisopropylaluminum, triisobutylaluminum and tri-n-butylaluminum; dialkylaluminum halides such as dimethylaluminum chloride, dimethylaluminum bromide, diethylaluminum chloride and diisopropylaluminum chloride; and alkylaluminum sesquihalides such as methylaluminum sesquichchloride, ethylaluminum sesquichloride, ethylaluminum sesquibromide and isopropylaluminum sesquichloride. Most preferable are triethylaluminum and triisobutylaluminum. It is also possible to use at least 1 of these organoaluminum compounds together.

Inorganic supports or organic supports which are a granular or spherical particulate solid having a particle diameter of 1–500 µm, preferably 5–300 µm are used as the compound (D).

An oxide is preferably used as the aforesaid fmely particulate inorganic carrier. More particularly, illustrative are, for example, $SiO_2$, $Al_2O_3$, MgO, $ZrO_2$, $TiO_2$ and a mixture of these oxides. Among these oxides, a carrier containing as a main ingredient at least one selected from the group consisting of $SiO_2$, $Al_2O_3$ and MgO is preferable. These inorganic oxide supports are usually employed after they are baked for 1–40 hours at 100–1000° C. Instead of baking, a chemical dehydrating method using, for example, $SiCl_4$, chlorosilane, etc. may be employed. Above all, illustrative of the inorganic compound utilizable as carrier are $SiO_2$, $Al_2O_3$, MgO, $TiO_2$, ZnO, etc. or a mixture of these, for example, $SiO_2$—$Al_2O_3$, $SiO_2$—MgO, $SiO_2$—$TiO_2$, $SiO_2$—$Al_2O_3$—MgO, etc. Among these, carriers chiefly containing $SiO_2$ or $Al_2O_3$ are preferable.

Further, examples of the fmely particulate organic carrier include fmely particulate organic polymers, for example, finely particulate polymers such as polyethylene, polypropylene, poly-1-butene, and poly-4-methyl-1-pentene and finely particulate polymers such as polystyrene.

The catalyst system used in the present invention which is comprised predominantly of the compound (A) the metallocene, the compound (B) the aluminoxane, the compound (C) the organoaluminum compound, and the compound (D) the fine particulate solid support, is composed of a supported-type catalyst component chiefly containing the compounds (A), (B) and (D) and the compound (C) which is preferably added separately to reaction system at the time of polymerization as scavenger.

The aforesaid supported-type catalyst component can be obtained by reacting the compound (A) with the compound (B) preferably in the presence of the compound (D). Usually, hydrocarbon-soluble metallocene compound and aluminoxane are converted into a desired supported catalyst by allowing them to deposit on a dehydrated support.

The order of adding the metallocene compound and the aluminxane may freely be changed. For example, the metallocene compound dissolved in an adequate hydrocarbon solvent can initially be added to the support and thereafter the aluminoxane can be added thereto. Alternatively, the aluminoxane and the metallocene compound are previously reacted together and the added to the support at the same time. It is also possible to add the aluminoxane initially to the support and then add the metallocene compound thereto. The temperature of the reaction is usually −20–100° C., preferably 0–100° C. while the time required for the reaction is usually at least 0.1 minute, preferably within the range of 1–200 minutes. The supported catalyst can be used at need after preliminary polymerization with a small amount of an olefin.

Examples of an olefin used for the preliminary polymerization include ethylene, propylene, 1-butene, 1-hexene, 3-methyl-1-butene, 4-methyl-1-pentene, etc. At least two of these monomers may be copolymerized.

The supported-type catalyst thus prepared is used for polymerization or copolymerization of propylene preferably together with the organoaluminum compound (C) employed as scavenger.

A known conventional polymerization process for polymers or copolymers of propylene is applicable to a process for producing polymers or copolymers of propylene. Thus, a variety of polymerization processes can be employed such as a slurry polymerization process wherein propylene is polymerized or copolymerized in an inert solvent, for example, an aliphatic hydrocarbon such as butane, pentane, hexane, heptane or isooctane; a alicyclic hydrocarbon such as cyclopentane, cyclohexane or methylcyclohexane; an aromatic hydrocarbon such as toluene, xylene or ethylbenzene; gasoline fractions or a hydrogenated diesel oil, a bulk polymerization process wherein propylene monomer per se is used as a solvent, a vapor phase polymerization process wherein polymerization of propylene is carried out in a vapor phase, a solution polymerization process wherein the resultant polymer or copolymer of propylene formed by polymerization is liquid, or a polymerization process wherein at least two of these polymerization processes are combined.

A polymerization condition similar to that used for polymerization or copolymerization of olefins by the aid of a known Ziegler catalyst system can be adopted, which includes a polymerization temperature of 50–150° C., preferably 50–100° C., a polymerization pressure of atmospheric pressure to 7 MPa, preferably 0.2–5 MPa, and a polymerization time of usually from one minute to 20 hours. In addition, regulation of the molecular weight of the obtained polymers or copolymers of propylene is attained by suitably selecting the above polymerization condition or by introducing a molecular weight regulator such as hydrogen into the reaction system.

After completion of the copolymerization, a known conventional catalyst deactivation treatment, a step for eliminating catalyst residues, a drying step and the like after-treatment are carried out to obtain the propylene copolymer aimed at.

An intrinsic viscosity [η] of the propylene copolymer of the present invention measured in tetralin at 135° C. was 0.2–10 dl/g.

In the propylene copolymer of the present invention obtained as above, a relation: log(MS)>−1.28×log(MFR)+0.44 exists between melt strength (MS) at 230° C. and melt flow index (MR) measured at 230° C. under a load of 21.18N.

In this case, the melt strength (MS) at 230° C. was measured using a melt tension tester Type 2 (manufactured by Toyo Seiki Mfg. Co, Ltd.) by heating an olefin polymer or copolymer composition at 230° C. in the apparatus, extruding the molten olefin polymer or copoplymer composition into the air through a nozzle having a diameter of 2.095 mm to form a strand and measuring tension (in terms of cN) of the strand of polypropylene composition taken up at a velocity of 3.14 m/min.

The propylene copolymer of the present invention has a ratio of a mis-inserted unit based on 2,1-insertion of propylene monomer in the total propylene insertion being 0.05–1.0%.

The ratio of a mis-inserted unit based on the 2,1-insertion was obtained by utilizing $^{13}$C-NMR with reference to Polymer 30, 1350 (1989).

As described in Japanese Laid-open Patent Appln. No. Hei. 7-138327 and Japanese Laid-open Patent Appln. No. Hei. 8-92317, a content of an α,ω-diene can be obtained by calculation utilizing $^{13}$C-NMR or by calculation of a difference between the number of moles of the diene monomer supplied at the time of polymerization and the number of moles of unreacted diene monomer at the time of finishing the polymerization.

The propylene copolymers of the present invention may be incorporated with various additives such as antioxidants, UV-absorbing agents, antistatic agents, nucleating agents, lubricating agents, incombustible agents, antiblocking agents, coloring agents, inorganic or organic fillers, or with various synthetic resins so far as the object of the present invention is not damaged. Usually, the copolymers are subjected to heating followed by melt-kneading and then to cutting to form pelletized chips for manufacturing various moldings.

EXAMPLES

The present invention will now be illustrated in more detail by way of Examples and Comparative Examples. The definitions for technical terms and the methods for measurements given in Examples and Comparative Examples are as follows:

Intrinsic viscosity [η]—A limiting viscosity measured in tetralin at 135° C. was measured by way of an Ostwald's viscosimeter (manufactured by Mitsui-Toatsu Kagaku KK) (Unit: dl/g).

Melt Flow Rate (MFR): In accordance with JIS K-7210, the value (Unit: g/10 min.) measured under the condition 14 (under a load of 21.18N, 230° C.) in Table 1 thereof.

Melt strength (MS): measured by way of a melt tension tester Type 2 (manufactured by KK Toyo SeiKi Seisakusho) (Unit: cN).

Melting point (Tm): Using DSC7 type Differential Scanning Calorimeter (manufactured by Perkin-Elmer), the melting points of polymers and copolymers of olefins were measured according to the method wherein a sample of the polymer or copolymer was heated from room temperature up to 230° C. at a heat-elevation rate of 30° C./min., maintained at the same temperature for 10 minutes, then depressed in temperature down to −20° C. at a rate of −20° C./min., maintained at this temperature for 10 minutes and again heated at a rate of 20° C./min. whereby a temperature showing a peak of melting was determined as melting point.

Crystallizing temperature (Tc): Using DSC7 type Differential Scanning Calorimeter (manufactured by Perkin-Elmer), the crystallizing temperature of polymers and copolymers of olefins was measured according to the method wherein a sample of the polymer or copolymer was heated from room temperature up to 230° C. at a heat-elevation rate of 30° C./min., maintained at the same temperature for 10 minutes, then depressed in temperature down to −20° C. at a rate of −20° C./min., maintained at the same temperature for 10 minutes and again heated up to 230° C. at a temperature-elevation rate of 20° C./min., maintained at the same temperature for 10 minutes, depressed in temperature down to 150° C. at a rate of −80° C./min., and further depressed in temperature at a rate of −5° C./min whereby a temperature showing the maximum peak at the time of crystallization was determined as the crystallization temperature (Unit: ° C.).

Molecular weight distribution (Mw/Mn): Mw, Mn and Mw/Mn were measured by calculation based on the result of the gel permeation chromatography (GPC) according to the following methods: Using an o-dichlorobenzene solution having a polymer concentration of 0.05% by weight and using a mixed polystyrene gel column (for example, PSKgel GMH6-HT marketed by Toso K.K.), the measurement was carried out at 135° C. As the measuring apparatus was used, for example, GPC-150 (manufactured by Waters Corp.).

Heat stability: A propylene copolymer in an amount of 100 parts by weight was incorporated with 0.1 part by weight of 2,6-di-tert-butyl-p-cresol and 0.1 part by weight of calcium stearate, and the mixture was melt-kneaded in an extrusion-pelletizer having a screw of 40 mm($\phi$ at 230° C. and pelletized to produce pellets of the propylene copolymer. Heat stability of the copolymer was measured as follows: The resultant pellets were melt-kneaded in the above extrusion-pelletizer and pelletized further two times, and thereafter the melt flow rate (MFR) of the finally obtained pellets was measured (Unit: g/10 min.) according to JIS K-7210, Condition 14 in Table 1 thereof. A difference between MFR of the initially obtained pellets and WFR of the finally obtained pellets was calculated (R of the final pellets minus NFR of the initial pelets, i.e. ΔMFR). The smaller the difference (ΔMFR), the better the heat stability.

Example 1
[Preparation of Supported-type Catalyst]

In a well dried 500 ml flask the air in which had been replaced with $N_2$ were placed 0.39 g (0.889 mmole) of dimethylsilylene(2,3,5-trimethylcyclopentadienyl) (2',4',5'-trimethylcyclopentadienyl)zirconium dichloride and 267 mmole of methylaluminoxane diluted with toluene (in terms of Al atom). The mixture was reacted together for 10 minutes. To this reaction mixture was added 10 g of silica (marketed by Grace Davison) baked at 800° C. for 8 hours, and the mixture was stirred for 10 minutes. While applying vacuum to the flask at the top of the container, a very slight stream of nitrogen was introduced at the bottom. The mixture was then heated at 70° C. while the solvent was allowed to evaporate for a period of 9 hours. The resultant dried solid was cooled at room temperature overnight. In a well dried 500 ml of flask the air in which had been replaced with $N_2$ were placed the resultant solid catalyst and 250 ml of isopentane, and the mixture was cooled to 0° C. Ethylene was then added to the flask at a flow rate of 80 ml/min. continuously for 4 hours to effect preliminary polymerization. The supernatant liquid was then removed by decantation and the residue was washed four times with 1000 ml of isopentane by decantation. The residue was dried in vacuo for 2 hours at room temperature to prepare 35 g of a supported-type catalyst.

[Production of Propylene Copolymer]

In a 15 liter autoclave the air in which had fully been replaced with nitrogen were placed 12 mmole of triethylaluminum, 2 g (14.5 rmmole) of 1,9-decadiene and 8 liters of liquefied propylene, and the mixture was stirred for 10 minutes while elevating temperature to 50° C. A slurry of the supported-type catalyst in an amount of 2.18 g prepared as above in hexane was introduced under pressure into the autoclave while washing it with 2 liters of liquefied propylene to initiate polymerization, and the polymerization reaction was carried out for 2 hours at 50° C. The resultant powder was 1.8 kg. Analysis of the copolymer of propylene and 1,9-decadiene thus obtained revealed that the melting point was 155.8° C., the crystallizing temperature was 114.8° C., the content of 1,9-decadicne was 0.01% by weight, the ratio of a mis-inserted unit based on 2,1-insertion of propylene monomer in the total propylene insertion was 0.4%, and the melt strength was 0.6 cN. Further, the MFR was 9.5 g/10 min, the Mw/Mn was 2.5 and the bulk density was 0.43 g/ml.

[Evaluation of Heat Stabilt]

The initial pellets have an MFR of 9.5 g/10 min while the final pellets have an MFR of 9.7 g/10 min . As a result, ΔMFR was 0.2, thus showing excellent heat stability.

Example 2
[Production of Propylene Copolymer]

In a 15 titer autoclave the air in which had fully been replaced with nitrogen were praced 12 mmole of triethylaluminum, 2 g (14.5 mmole) of 1,9-decadiene and 8 liters of liquefied propylene, and the mixture was stirred for 10 minutes while elevating temperature to 50° C. A slurry of the supported-type catalyst in an amount of 2.1 g prepared as in Example 1 in hexane was introduced under pressure into the autoclave while washing it with 2 liters of liquefied propylene to initiate polymerization, and the polymerization reaction was carried out for 2 hours at 50° C. The resultant powder was 1.9 kg. On analysis of the copolymer of propylene and 1,9-decadiene thus obtained revealed that a melting point was 156.6° C., a crystallizing temperature was 114.9° C., a content of 1,9-decadiene was 0.02% by weight, a ratio of a mis-inserted unit based on 2,1-insertion of propylene monomer in the total propylene insertion was 0.4%, and a melt strength was 7.5 cN. Further, an MFR was 1.0 g/10 min, an Mw/Mn was 2.6 and a bulk density was 0.43 g/ml.

Comparative Example 1
[Preparation of Supported-type Catalyst]

A supported-type catalyst was prepared as in Example 1 except that dimethyl-silylene-bis(2-methyl-4,5-benzoindenyl)zirconium dichloride was used as metallocene in place of dimethylsilylene(2,3,5-trimethylcyclopentadienyl)(2',4',5'-trirnethylcyclopentadienyl)zirconiuim dicbloride.

[Production of Propylene Copolymer]Comparative Example 2
[Production of Propylene Copolymer]

In a 15 liter autoclave the air in which had fully been replaced with nitrogen were placed 12 mmole of triethylaluminum, 2 g (14.5 mmole) of 1,9-decadiene and 8 liters of liquefied propylene, and the mixture was stirred for 10 minutes while elevating temperature to 50° C. The supported-type catalyst in an amount of 2.0 g prepared as above in a hexane slurry was introduced under pressure into the autoclave while washing it with 2 liters of liquefied propylene to initiate polymerization and the polymerization reaction was carried out for 2 hours at 50° C. The resultant powder was 2.0 kg. Analysis of the copolymer of propylene and 1,9-decadiene thus obtained revealed that the melting point was 144.2° C., the crystallizing temperature was 1067° C., the content of 1,9-decadiene was 0.01% by weight, the ratio of a mis-inserted unit based on 2,1-insertion of propylene monomer in the total propylene insertion was 1.6%, and the melt strength was 5.9 cN. Further, the MFR was 1.1 g/10 min, the Mw/Mn was 2.7 and the bulk density was 0.40 g/ml.

[Production of Proplene Copolymers]

In a 15 liter autoclave the air in which had fully been replaced with nitrogen were placed 8 liters of liquefied propylene and the temperature was elevated up to 50° C. while stirring. A slurry of the supported-type catalyst in an amount of 2.3 g prepared as in Example 1 in hexane was introduced under pressure into the autoclave while washing it with 2 liters of liquefied propylene to initiate polymerization and the polymerization reaction was carried out for 2 hours at 50° C. The resultant powder was 0.6 kg. The melt strength of the propylene polymer thus obtained was 0.2 cN. Further, the MFR was 9.6 g/10 min, the Mw/Mn was 2.4 and the bulk density was 0.40 g/ml.

As is evident from a comparison of Examples with Comparative Examples, it is noted that products excellent in physical properties such as melt strength and molecular weight are not obtained in the case wherein a supported-type catalyst other then the specific metallocene compound is used at a polymerization temperature above 45° C.

INDUSTRIAL UTILIZABILITY

According to the present invention, propylene copolymers of excellent particulate properties and heat stability wherein a percentage of mis-insertion in polymers is highly controlled, a molecular weight distribution is narrow, a melt strength is high while an MFR is low, are obtained by the aid of a specific metallocene catalyst system at a practical polymerization temperature.

What is claimed is:

1. A propylene copolymer comprised predominantly of a random copolymer of propylene and an α,ω-diene and having a melting point of 147–160° C., a ratio of a mis-inserted unit based on 2,1-insertion of propylene monomer in the total propylene insertion of 0.05–81.0%, a content of the α,ω-diene of 0.01–2% by weight, and a Mw/Mn of 1.5–3.8.

2. The propylene copolymer according to claim 1, wherein a melting point is 152–160° C.

3. A propylene copolymer comprised predominantly of a random copolymer of propylene and 0.1–15% by weight of ethylene and/or a α-olefin having at least 4 carbon atoms and having melting point of 100–160° C., a ratio of a mis-inserted unit based on 2,1-insertion of propylene monomer in the total propylene insertion of 0.05–1.0%, a content of an α,ω-diene of 0.01–2% by weight, and a Mw/Mn of 1.5–3.8, which has been obtained by conducting copolymerization of propylene, α,ω-diene, ethylene and/or an α-olefin having at least 4 carbon atoms.

4. A propylene-based block copolymer having a ratio of a mis-inserted unit based on 2,1-insertion of propylene monomer in the total propylene insertion being 0.05–1.0%, and a content of an awiene being 0.01–2% by weight, which is comprised of a propylene homopolymer or a propylene random copolymer containing 0.1–15% by weight of ethylene and/or an golefin with at least 4 carbon atoms as a first stage polymerization product, and a propylene random copolymer as a rubbery component containing 30–80% by weight of ethylene and/or α-olefin with at least 4 carbon atoms as a successive second stage polymerization product, a proportion of the second stage polymerization product being 5–70% by weight, wherein the propylene-based block copolymer comprises an α,ω-diene which has been random copolymerized at the first stage and/or the second stage polymerization.

5. The propylene copolymer according to claim 2, wherein the α-olefin is at least one selected from the group consisting of 1-butene, 1-hexene and 1-octene.

6. The propylene copolymer according to claim 1, wherein the α,ω-diene is at least one seleted from the group consisting of 1,5-hexadiene, 1,7-octadiene and 1,9-decadiene.

7. The propylene copolymer according to claim 1, wherein the α,ω-diene is 1,9-decadiene.

8. The propylene copolymer according to claim 1, wherein the content of the α,ω-diene is from 0.01% by weight to not more than 0.05% by weight.

9. A process for producing the propylene copolymer of claim 1, which comprises treating a mixture of propylene and α,ω-diene above 45° C. with a catalyst system comprised predominantly of the following compounds (A), (B), (C) and (D):

the compound (A) being a transition metal compound of the general formula:

$$Q(C_5H_{4-m}R^1_m)(C_5H_{4-n}R^2_n) MXY \quad [I]$$

wherein $(C_5H_{4-m}R^1_m)$ and $(C_5H_{4-n}R^2_n)$ each stand for a substituted cyclopentadienyl group, m and n each stands for an integer of 1–3, $R^1$ and $R^2$ may be the same or different and each stands for a hydrocarbon group with 1–20 carbon atoms, a silicon-containing hydrocarbon group, with the proviso that the site and kind of $R^1$ and $R^2$ on the cyclopentadienyl rings should take a configuration where any symmetrical plane containing M is absent and that $R^1$ or $R^2$ is existent in at least one carbon atom adjacent to the carbon atom connected to Q in at least one cyclopentadienyl ring, Q stands for a bivalent hydrocarbon radical, unsubstituted silylene radical or a hydrocarbon-substituted silylene radical bridging the groups $(C_5H_{4-m}R^1_m)$ and $(C_5H_{4-n}R^2_n)$, M stands for a transition metal Ti, Zr or Hf, and X and Y may be the same or different and each stands for a hydrogen atom, a halogen atom or a hydrocarbon group, the compound (B) being an aluninoxane, the compound (C) being an organoaluminum compound, and the compound (D) being a finely particulate carrier.

10. A process for producing the propylene copolymer according to claim 9, wherein the compound (A) is dimethylsilylene(2,3,5-trimethylcyclopentadienyl)–(2',4',5'-trimethylcyclopentadienyl)zirconium dichloride or dimethylsilylene(2,3,5-trimethylcyclopentadienyl)(2',4',5'-trimethylcyclopentadienyl)hafnium dichloride.

11. A process for producing the propylene copolymer according to claim 9, wherein the copolymers are produced by a vapor phase polymerization process.

12. The propylene copolymer according to claim 3, where in the α-olefin is at least one selected from the group consisting of 1-butene, 1-hexene and 1-octene.

13. The propylene copolymer according to claim 3, wherein the α,ω-diene is at least one selected from the group consisting of 1,5-hexadine, 1,7-octadiene and 1,9-decadiene.

14. The propylene copolymer according to claim 4, wherein the α,ω-diene is at least one selected from the group consisting of 1,5-hexadiene, 1,7-octadiene and 1,9-decadiene.

15. The propylene copolymer according to claim 3, wherein the α,ω-diene is 1,9-decadiene.

16. The propylene copolymer according to claim 4, wherein the α,ω-diene is 1,9-decadiene.

17. The propylene copolymer according to claim 3, wherein the content of the α,ω-diene is from 0.01% by weight to not more than 0.05% by weight.

18. The propylene copolymer according to claim 4, wherein the content of the α,ω-diene is from 0.0% by weight to not more than 0.05% by weight.

19. A process for producing the propylene copolymer of claim 3, which comprises treating a mixture of propylene, α,ω-diene, ethylene and/or an α-olefin having at least 4 carbon atoms above 45° C. with a catalyst system comprised predominantly of the following compounds (A), (B), C and (D):

the compound (A) being a transition metal compound of the general formula:

$$Q(C_5H_{4-m}R^1{}_m)(C_5H_{4-n}R^2{}_n) \text{ MXY} \qquad [I]$$

wherein $(C_5H_{4-m}R^1{}_m)$ and $(C_5H_{4-n}R^2{}_n)$ each stand for a substituted cyclopentadienyl group, m and n each stands for an integer of 1–3, $R^1$ and $R^2$ may be the same or different and each stands for a hydrocarbon group with 1–20 carbon atoms, a silicon-containing hydrocarbon group, with the proviso that the site and kind of $R^1$ and $R^2$ on the cyclopentadienyl rings should take a configuration where any symmetrical plane containing M is absent and that $R^1$ or $R^2$ is existent in at least one carbon atom adjacent to the carbon atom connected to Q in at least one cyclopentadienyl ring, Q stands for a bivalent hydrocarbon radical, unsubstituted silylene radical or a hydrocarbon-substituted silylene radical bridging tile groups $(C_5H_{4-m}R^1{}_m)$ and $(C_5H_{4-n}R^2{}_n)$, M stands for a transition metal Ti, Zr or Hf, and X and Y may be the same or different and each stands for a hydrogen atom, a halogen atom or a hydrocarbon group, the compound (B) being an alurninoxane, the compound (C) being an organ noaluminum compound, and the compound (D) being a finely particulate carrier.

20. A process for producing the propylene-based block polymer of claim 4, which comprises treating a ixture of propylene, α,ω-diene, ethylene and/or an α-olefian having at least 4 carbon at oms above 45° C. with a catalyst system comprised predominantly of the following compounds (A), (B), (C) and (D):

the compound (A) being a transition metal compound of the general formula:

$$Q(C_5H_{4-m}R^1{}_m)(C_5H_{4-n}R^2{}_n) \text{ MXY} \qquad [I]$$

wherein $(C_5H_{4-m}R^1{}_m)$ and $(C_5H_{4-n}R^2{}_n)$ each stand for a substituted cyclopentadienyl group, m and n each stands for an integer of 1–3, $R^1$ and $R^2$ may be the same or different and each stands for a hydrocarbon group with 1–20 carbon atoms, a silicon-containing hydrocarbon group, with the proviso that the site and kind of $R^1$ and $R^2$ on the cyclopentadienyl rings should take a configuration where any symmetrical plane containing M is absent and that $R^1$ or $R^2$ is present on at least one carbon atom adjacent to the carbon atom connected to Q in at least one cyclopentadienyl ring, Q stands for a bivalent hydrocarbon radical, unsubstituted silylene radical or a hydrocarbon-substituted silylene radical bridging the groups $(C_5H_{4-m}R^1{}_m)$ and $(C_5H_{4-n}R^2{}_n)$, M stands for a transition metal Ti, Zr or Hf, and X and Y may be the same or different and each stands for a hydrogen atom, a halogen atom or a hydrocarbon group, the compound (B) being an aluminoxane, the compound (C) being an organoaluninum compound, and the compound (D) being a finely particulate carrier, wherein an α,ω-diene is random copolymerized with a propylene-based copolymer at the first state and/or the second stage polymerization.

* * * * *